Nov. 5, 1968    L. F. FRANK    3,409,354
OPTICAL SYSTEMS WITH AXIAL MIRRORS
Filed June 8, 1966    4 Sheets-Sheet 1
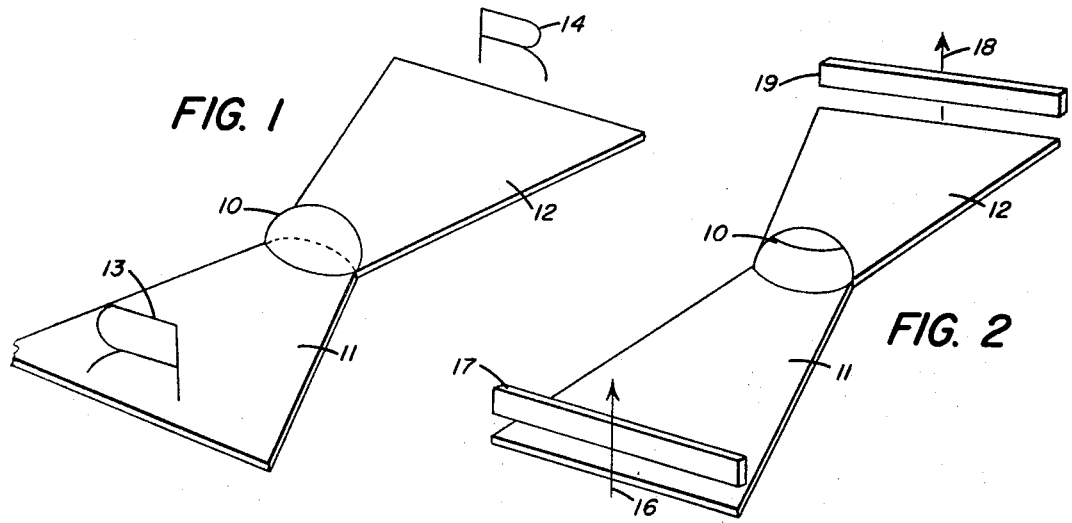
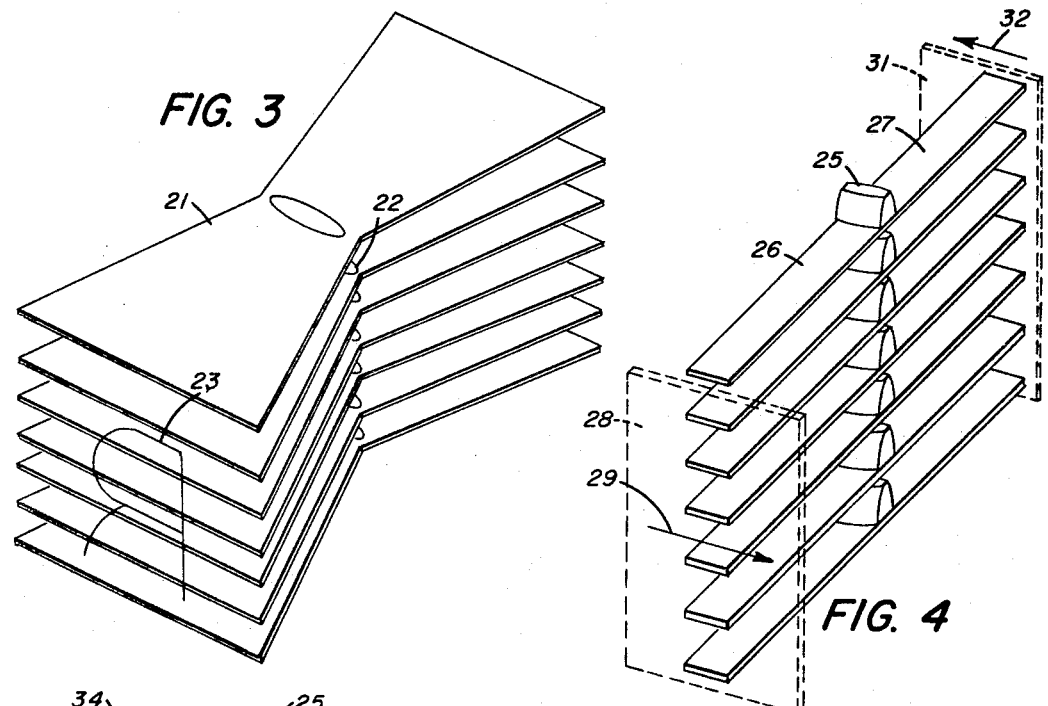
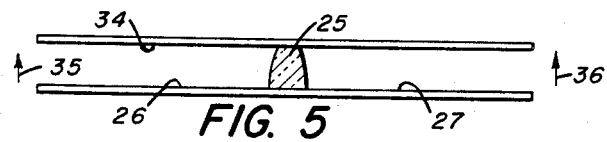
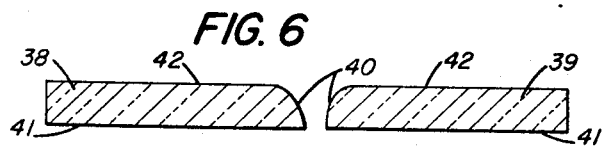
LEE F FRANK
INVENTOR.
ATTORNEYS.

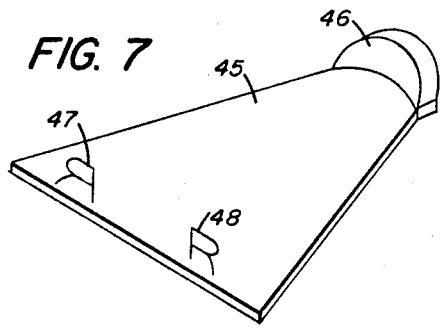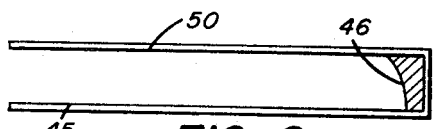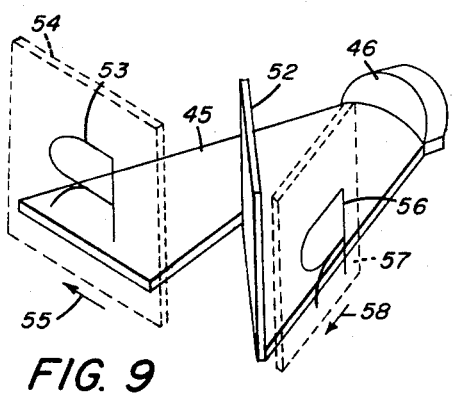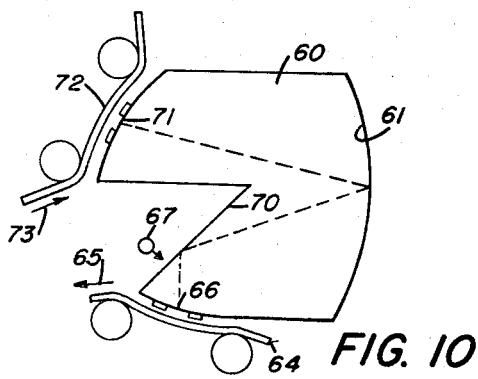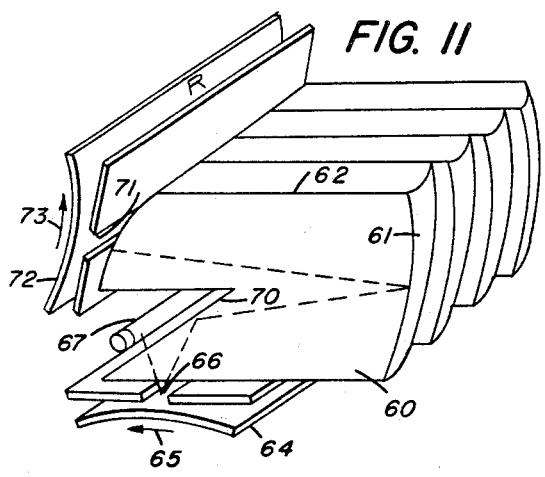

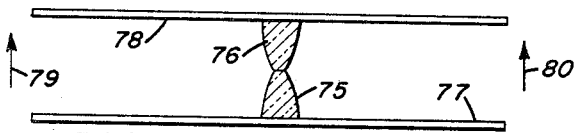
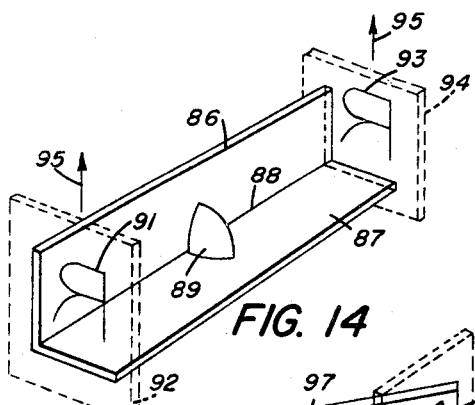
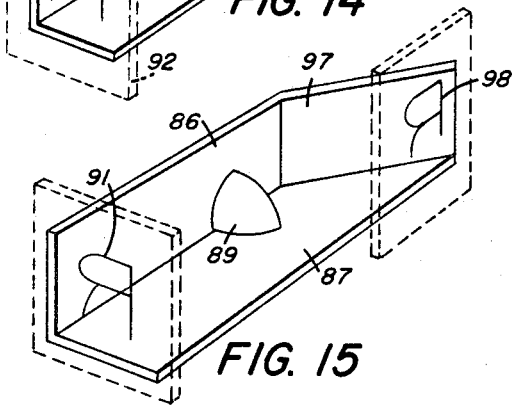
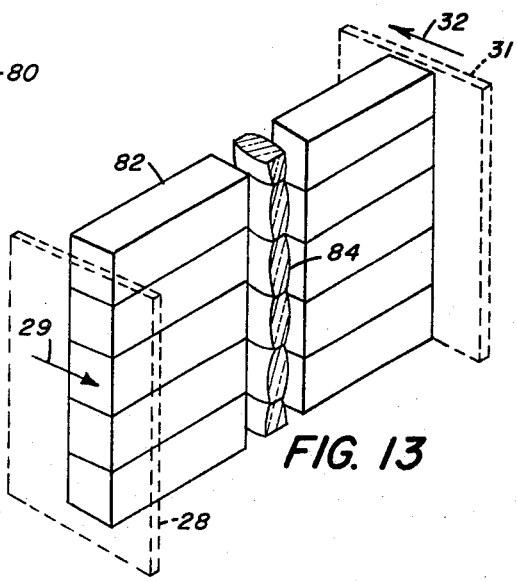
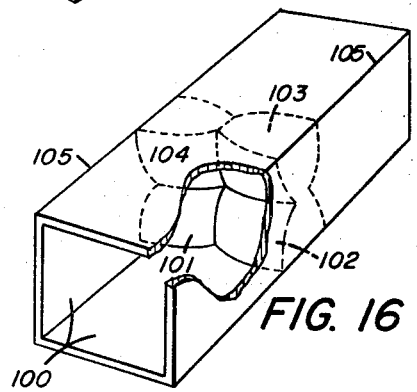
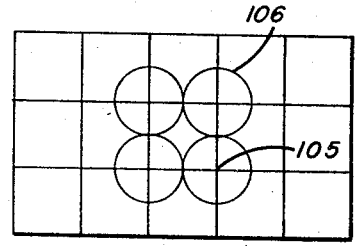
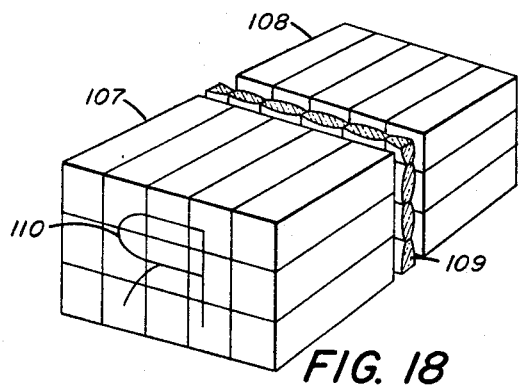

LEE F FRANK
INVENTOR.

ATTORNEYS

United States Patent Office 3,409,354
Patented Nov. 5, 1968

3,409,354
OPTICAL SYSTEMS WITH AXIAL MIRRORS
Lee F. Frank, Rochester, N.Y., assignor to Eastman Kodak Company, Rochester, N.Y., a corporation of New Jersey
Filed June 8, 1966, Ser. No. 556,215
15 Claims. (Cl. 355—1)

The present invention relates to optical systems for forming a real image, usually at 1:1 magnification, of an object.

The primary object of the invention is to provide an optical system for document copying.

The invention employs an objective either in the form of a lens or a concave reflector or other reflecting objective. It also employs a plane mirror lying on the optic axis of the objective in both the object space and image space. Essentially one utilizes a half lens (or half concave reflector) and the image thereof seen in the plane axially located mirror.

According to a preferred embodiment of the invention, an additional mirror is positioned parallel to the axial mirror and facing it, to provide high optical efficiency in a way which constitutes a species of the invention described in my co-filed application, Ser. No. 556,032, "Efficient Optical System," filed June 8, 1966.

The present invention is particularly useful in scanning systems in which a document is moved past an elongated object gate and an image of the document is projected into focus on a corresponding image gate past which a sensitive sheet is moved synchronously with the movement of the document. To copy from an opaque document onto an opaque sheet which is to constitute the final print, requires that the image be a right-reading one. On the other hand, systems which provide the final print by transfer from the sensitive sheet, require the image on the sensitive sheet to be wrong-reading. Various embodiments of the invention provide right-reading or wrong-reading images as desired.

One special embodiment of the invention employs two axial mirrors at right angles together with what may be termed a quarter lens. An extension of this embodiment employs an array of optical channels of square cross section, which array produces a complete image of the whole document at one time.

Other objects and advantages of the invention will be apparent from the following description when read in connection with the accompanying drawings, in which:

FIG. 1 is a perspective view schematically illustrating the operation of the invention.

FIG. 2 similarly illustrates the application of the invention to an optical system which scans in a direction at right angles to the axial mirror.

FIG. 3 similarly illustrates how a pile of such systems can produce an image of a whole document.

FIG. 4 illustrates an embodiment of the invention which scans a document in a direction parallel to the axial mirror.

FIG. 5 is a vertical section of one element of the system shown in FIG. 4 and incorporating the high optical efficiency discussed above.

FIG. 6 similarly illustrates an arrangement alternative to that shown in FIG. 5.

FIG. 7 schematically illustrates the operation of the invention using a concave reflector as a reflecting objective.

FIG. 8 is a vertical section of the arrangement shown in FIG. 7 illustrating the addition of high optical efficiency as discussed above.

FIG. 9 is similar to FIG. 7 and illustrates a convenient manner for providing a right-reading image.

FIGS. 10 and 11 are respectively a vertical section and a perspective view illustrating an embodiment of the invention incorporating the principle of FIG. 9.

FIG. 12 is similar to FIG. 5 and illustrates a slightly different arrangement providing high optical efficiency.

FIG. 13 is similar to FIG. 4 but utilizes the embodiment shown in FIG. 12.

FIG. 14 illustrates an embodiment of the invention employing a quarter lens and two axial mirrors for giving a wrong-reading image.

FIG. 15 similarly illustrates how a right-reading image is obtainable with the quarter lens embodiment.

FIG. 16 schematically shows, partly broken away, a light channel of square cross section incorporating four quarter lens units.

FIGS. 17 and 18 are respectively an end view and a perspective view of an array of square channels of the type shown in FIG. 16.

Figure 19:
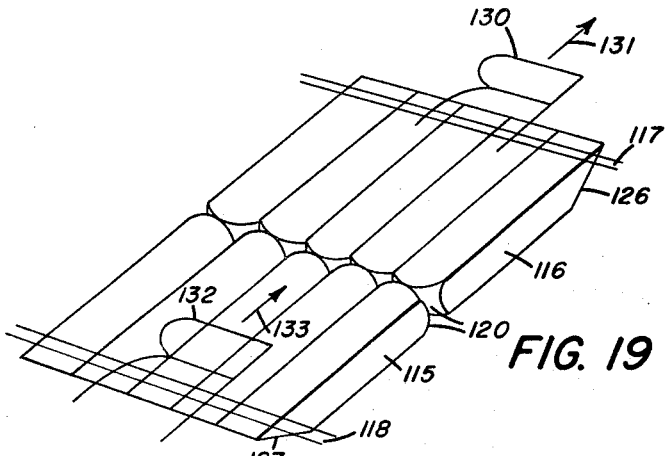
Figure 20:
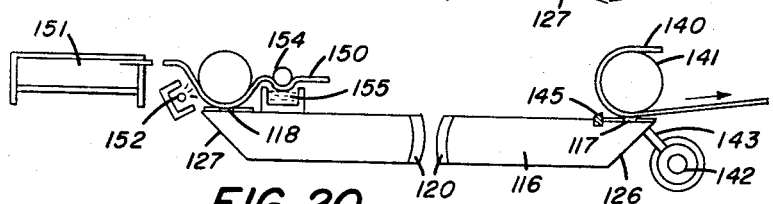
Figure 21:
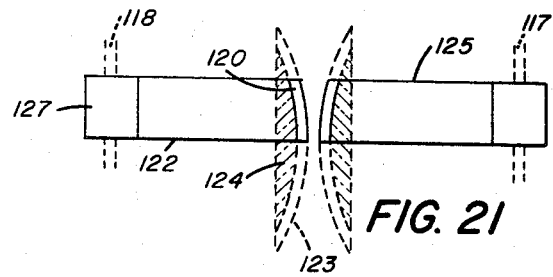

FIGS. 19, 20 and 21 schematically illustrate respectively in perspective, in elevation and in plan, a right-reading scanner system for document copying.

Figure 22:
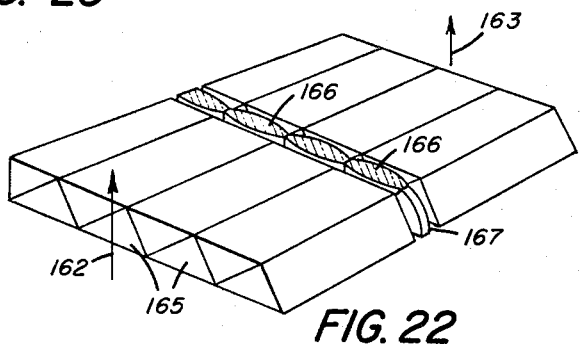

FIGS. 21 and 22 are respectively an end view and perspective of scanner optics employing light channels whose cross section is a right angle triangle.

In FIG. 1 an optical system consisting of a half lens 10 and plane mirrors 11 and 12 lying on the optic axis respectively in the object and image space receives light from an object 13 and forms a right-reading image 14 thereof. The object 13 is the letter R on the face of a document whose support is not shown. The document is facing the lens 10 and hence the object 13 is seen backwards as if seen through the base of the document itself. Light from the object 13 is focused by the lens 10 and strikes either the mirror 11 or the mirror 12 before coming to focus at the image 14. The single reflection provides the right-reading image.

In FIG. 2 the top of the lens 10 has been cut away, as it is in most embodiments of the invention. The object in this case is moved as indicated by the arrow 16 past an object gate defined by the mirror 11 and the edge 17 of an opaque bar. Similarly the sensitive sheet receiving the image is moved as indicated by the arrow 18 past an elongated image gate defined by the mirror 12 and the edge 19 of a mask.

Alternatively as shown in FIG. 3, one can form a stack or pile 21 of units similar to that shown in FIG. 2. Each unit consists of a mirror and a "half lens" 22. A document placed against one end of the pile and carrying a letter R, as shown at 23, will form a complete right-reading image thereof at the other end. The image is essentially unbroken although lines due to the thickness of the mirror are usually detectable.

This pile of units can be used for scanning in a direction parallel to, at right angles to, or even obliquely to the mirrors. The arrangement shown in FIG. 4 is made up of a pile of units each having a lens 25 and mirrors 26 and 27 for receiving light from a document 28 which moves in a direction indicated by the arrow 29. Light from this document is focused by the pile of channels onto a sensitive sheet 31 which moves in the direction indicated by the arrow 32. We have a right-reading image, but countercurrent scanning in which the document and sensitive sheet move in opposite directions. Actually any system in which the document and sheet both move clockwise or both move counterclockwise relative to the center of the optical system is said to be countercurrent scanning. This point is mentioned here since in FIGS. 19, 20 and 21 described below, one has a countercurrent system in which the document and the sensitive sheet move in the same direction in the same plane.

In FIG. 5, the under surface 34 of the mirror immediately above the unit illustrated is also a plane reflector. As pointed out in connection with FIG. 1, light from an object 35 is focused by the lens 25 and one or other of the mirrors 26 and 27 to form an upright right-reading image 36. The mirror 34 acts to provide increased optical efficiency by reflecting additional light from the object 35 through the optical system into focus at the image 36. It should be noted that all light from the object 35 which strikes the mirror 34 in the object space also strikes it again in the image space after having been focused by the lens 25. This light also strikes one or other of the mirrors 26 or 27 and thus suffers three reflections.

In FIG. 6 an optical unit similar to that shown by FIG. 5 is made up of two solid glass or plastic elements 38 and 39, the facing surfaces 40 of which constitute half lenses. The surfaces 41 and 42 are totally internally reflecting. Thus the surface 41 constitutes the axial mirror according to the invention, and the surface 42 constitutes the parallel mirror to provide the increased optical efficiency.

In FIG. 7 a plane mirror 45 lies on the optic axis of a concave reflector 46 so that an object 47 is focused to form a wrong-reading image 48 which is nevertheless an erect image. Light from the object 47 is reflected once by the concave reflector 46. Since this constitutes an even number of reflections the image 48 is wrong-reading. It appears right-reading in the figure since the illustration is from the back of a document or sensitive sheet. Wrong-reading images are required in copying systems in which the image is first recorded on a sensitive sheet and then transferred to a final print.

In FIG. 8 an additional reflector 50 is added and since the objective 46 is a reflecting one, the mirror 50 is in both the object space and the image space. The mirror 50 is parallel to the axial mirror 45 and provides increased optical efficiency as described in my co-filed application mentioned above.

As illustrated in FIG. 9, a right-reading image can be provided by a mirror 52 at right angles to the mirror 45; this introduces an additional reflection. In this case the object 53 carried by a document 54 moves as indicated by 55. A right-reading image 56 on a sensitive sheet 57 moves as indicated by the arrow 58. In this sense the system is a countercurrent scanner since the object and image are both moving clockwise as viewed from the top, relative to the reflector 46. However it should be noted that this system could have both the document 54 and the sensitive sheet 57 moving upwards or both moving downwards past the horizontal object and image gates much the same as in FIG. 2. In this case, the document and the sensitive sheet can be moving in the same direction. However since they are both on the same side of the reflecting object 46 they would both be moving clockwise or both counterclockwise as required by countercurrent systems.

The application of the arangement shown in FIG. 9 to a simple embodiment of the invention employing a pile of reflecting units is shown in FIGS. 10 and 11. In this case each unit 60 includes a concave reflector 61 and a plane mirror 62 lying on the optic axis of the reflector 61. A document 64 is moved as indicated by arrow 65 past an object gate 66 where it is illuminated from the inside by a lamp 67. Light from the object gate 66 is reflected by a plane reflector 70 perpendicular to the reflector 62 to the concave reflector 61 and after reflection once by the axial mirror 62 comes to focus at the image gate 71 on a sensitive sheet 72 moving in the direction indicated by the arrow 73.

The optical system is made up of a pile of units placed very close together. Preferably the adjacent surfaces are metallized to insure total internal reflection. The axial surface in each unit constitutes the axial mirror according to the invention. This same interface provides the additional mirror for the adjacent unit to produce the increased optical efficiency as described in connection with FIG. 8 above. It should be noted that light from the lamp 67 strikes the reflecting surface 70 at normal incidence and passes straight through this surface to illuminate the document 64 at the object gate 66. However light from the document strikes the surface 70 at greater obliquity and is totally internally reflected to the concave mirror 61.

FIG. 12 is similar to FIG. 5 except that there are two half lenses 75 and 76 each with its own axial mirror 77 and 78 respectively. Any light from the object 79 striking the mirror 78 and then passing though the lens 75 will strike both the mirror 77 and the mirror 78 a second time before reaching the image 80. Thus the mirror 78 acts as the efficiency increasing mirror for the lens 75 while also acting as the axial mirror of the lens 76.

FIG. 13 is similar to FIG. 4 but employs channel units 82 and 83 whose top and bottom surfaces are metallized and whose side surfaces are blackened so as to absorb scattered light. The interface between the channels lie on the optic axes of lenses 84 so that a pair of half lenses is aligned with each pair of channels. Thus each unit is optically the same as shown in FIG. 12. Again a document 28 moves as indicated by the arrow 29 and the sensitive sheet 31 moves as indicated by arrow 32, scanning to produce a right-reading image.

In FIG. 14 two mirrors 86 and 87 at right angles to each other coincide along the optic axis 88 of a positive lens 89. Every ray from an object 91 on a document 92 is reflected twice before reaching the wrong-reading image 93 on a sensitive sheet 94. The document and sheet may move in the same direction as indicated by arrows 95 either upward as shown or transversely.

The addition of an additional reflector 97 as shown in FIG. 15 produces a right-reading image 98 of the object 91. Again both sheets may move up or down or both may move clockwise relative to the lens 89.

In the same way as two half lens systems are combined in FIG. 12, four quarter lens systems can be combined as shown in FIGS. 16–18. In FIG. 16 a square channel having internally reflecting surfaces 100 includes four quarter lenses 101, 102, 103 and 104, the four edges 105 of the channel being the respective optic axis of the lenses.

A large matrix of such units could be made up as illustrated in FIGS. 17 and 18. Although the quarter lenses actually extend all the way to the center of the channel, they are shown as simple circles 106 in FIG. 17 since otherwise the end view would be simply a square and quite ambiguous. In FIG. 18 the lenses are between square plastic rods 107 and 108. Four quarter lenses fill the space between each pair of rods. The lenses 109 are spaced between the rods much as the lenses 84 are in FIG. 13. However the important difference between FIG. 13 and FIG. 18 is that the image is continuous in both dimensions in FIG. 18 even though it is wrong reading. That is, the upper right corner 110 of the object (the letter R) as seen through the base of a document not shown appears in the upper right hand corner at the image plane and would move in the same direction as the object if the letter were moved. In FIG. 13 on the other hand, the images erecet and reverse from right to left as it must be to be right-reading. If an array of channels of half lenses of the FIG. 13 type were made up, each vertical section of the image would be turned the wrong way relative to the next vertical section. In FIG. 18 on the other hand, the complete image is properly reproduced with all parts properly oriented relative to the other parts (except that the image is wrong-reading).

FIG. 19 illustrates a very useful modification of the arrangement shown in FIGS. 4 and 6. In FIG. 19 there are a plurality of channels made up of square rod units 115 and 116 whose top and bottom surfaces are opaque except adjacent to the entrance or object gate 117 and exit or image gate 118. The sides and interfaces between adjacent units are either totally internally reflecting or are made so by metallizing. The adjacent ends 120 of the rods 115 and 116 are half lenses. This is perhaps best illustrated in FIG. 21. The side elevation, as seen in FIG. 20 shows a symmetrical convex surface 120. As seen in FIG. 21 this surface 120 is part of the lens whose optic axis lies in the surface 122. By broken lines one sees an imaginary plano convex lens 123 with a cut-away surface 124. The actual lens 120 is seen to be part of this imaginary lens 123.

Light through the object gate 117 is reflected by a 45° surface 126 toward the air lens made up of surfaces 120. After the light passing through the surface and is focused thereby, it is reflected by another 45° surface 127 upward to the image gate 118. An object 130 moves as indicated by arrow 131 and an image 132 thereof moves as indicated by arrow 133. It will be noted that except for the reflections at the surfaces 126 and 127, the object and image are moving much as those in FIG. 4. When viewed from the left in FIG. 19, the image and object (both moving in the same direction and in the same plane) can be considered as moving counterclockwise relative to the lens 120, which is the same way the object and image move in FIG. 4 when viewed from the top. This is by definition countercurrent scanning.

Although the unit may have any orientation relative to the earth, it is convenient to use the terms horizontal and vertical relative to each other. In FIG. 19 the units are said to be juxtaposed (relatively) horizontally with the axial reflecting surfaces 122 vertical. The units are shown all facing the same way but some could face the other way so that axial reflecting surfaces touch. The surfaces 126 and 127 are at 45° to the horizontal and at 90° to each other.

This optical system is directly applicable to document copying in almost innumerable different ways. Omitting unessential details of the copier, one such arrangement is shown in FIG. 20 where a document 140 is moved under a roller 141 passing an object gate 117. At this point it is illuminated by a lamp 142, edgewise through a glass or plastic plate 143 which sends the light directly to the object gate 117. It should be noted that the light from the lamp 142 strikes the surface 126 at normal incidence and passes directly through it. To prevent any light from the plate 143 being scattered directly along the tube 116, a groove is cut in the upper surface adjacent to the object gate 117 and is filled with opaque material 145. Light reflected from the document at the object gate 117 is then reflected (total internal reflection) by the surface 126 through the lens 120 and is reflected also by the surface 122 either in the object space or in the image space. It may also be reflected by the other surface 125 of the channel an even number of times to increase optical efficiency, all as discussed above. Eventually the light is reflected by the surface 126 to focus on the sensitive sheet 150 at the image gate 118. The system is useful in ordinary photographic printers, but is here illustrated with a xerography system in which paper coated on the under surface with photoconductive zinc oxide in resin is moved one sheet at a time from a container 151 past a high voltage wire 152 which, by corona discharge, uniformly charges the photoconductive sheet immediately before it passes the image gate 118. After imagewise exposure at the image gate 118 the sensitive sheet with the charge image thereon passes under a roller 154 and through a liquid toning bath 155 which develops the image in the well-known way. The present invention is concerned only with the optical system and not with the means for moving the document and sensitive sheet through their respective gates.

Figure 23:
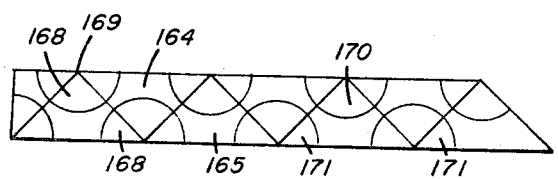

A further understanding of the potentialities of the invention will be realized from a study of the embodiments shown in FIGS. 22 and 23. Both of these embodiments are useful for scanning; if the object moves vertically upward as indicated by the arrow 162 in FIG. 22, the image will likewise move upward as indicated at 163. In each of these systems an array of oppositely oriented channels 164, 165 of right-triangular section is utilized, with a portion of a lens extending into each channel.

In the form shown in FIG. 22, half lenses 166, 167 are arranged so that their optic axes are positioned at the middle of the hypotenuse sides of the channels 164, 165 respectively. Operation is similar to that of FIGS. 2, 4 or 12.

In the form shown in FIG. 23, the lens elements 168 are positioned with their optic axes coinciding with the joining corners 169 of adjacent channels 164, 165. Thus there will be, in effect, a quarter lens 170 at the right-angled corner of each channel and an eighth lens 171 at each of the other (45°) corners thereof. Operation is similar to that of the arrangements shown in FIGS. 14–18.

In both of these forms shown in FIGS. 22 and 23, all faces (except the ends) of the individual channels will preferably be substantially totally reflecting. It should be noted that, as was the case in conjunction with FIG. 17, the individual lens elements in both these forms would normally abut and blend into one another. However, to more clearly show the principle of operation, the lens elements are shown as being circular segments, spaced slightly from one another. These triangular systems have an advantage over the earlier described rectangular systems in that the boundaries will not tend to cause noticeable scan lines in the reproduced image. However the assembly of a system using triangular elements is somewhat more difficult and hence the rectangular systems have certain manufacturing advantages.

The invention is not limited to the various species shown but is of the scope of the appended claims.

I claim:
1. An efficient optical system comprising
   focusing means for receiving a beam of light from an object and for forming a real image thereof,
   an axial reflector coplanar with the optic axis of the focusing means on both the object and image side of the focusing means,
   a second plane reflector to one side of said first beam for receiving a second beam from the object and reflecting it to the focusing means and axial reflector,
   and a third plane reflector for receiving the second beam from the focusing means and axial reflector and oriented to reflect said second beam into focused register with said image.

2. A system according to claim 1 in which the focusing means is an objective, the image is at unit magnification and the second and third plane reflectors are coplanar with each other and parallel to the axial reflector.

3. A system according to claim 2 including
   means for defining elongated object and image gates parallel to each other, and a plurality of such objectives in a line parallel to and symmetrically between the gates, the axial reflector and the other plane reflector for each objective being in planes orthogonal to the gates and said line, whereby juxtaposed segments of an object at the object gate are imaged respectively by the objectives and reflectors juxtaposed and non-inverted at the image gate.

4. A system according to claim 3 including means for moving a document across the object gate whereby an image of the document moves across the image gate and means for moving an image receiving sheet synchronously with said image across the image gate.

5. A system according to claim 1 in which the focusing means is
   a concave reflector,
   the image is at unit magnification and a single plane reflector spaced from and parallel to the axial reflector constitutes both said second and third plane reflectors.

6. A system according to claim 5 including
means for defining object and image gates between the planes of the single and axial reflectors, offset from one another and optically at the same distance from the concave reflector and an additional plane reflector orthogonal to said planes and oriented to reflect the beams once as they pass from the object gate to the image gate via the concave reflector.

7. A system according to claim 6 in which the gates are elongated in a direction perpendicular to the planes of the single and axial reflectors and including
a plurality of such concave reflectors each with its associated plane reflectors, juxtaposed in a line parallel to the elongation of the gates,
whereby juxtaposed segments of an object at the object gate are imaged respectively by the concave reflectors and plane reflectors juxtaposed and non-inverted at the image gates.

8. A system according to claim 7 including means for moving a document across the object gate whereby an image of the document moves across the image gate and means for moving an image receiving sheet synchronously with said image across the image gate.

9. A system according to claim 1 in which the focusing means is an objective, the image is at unit magnification and
including
two axial plane reflectors orthogonal to each other and intersecting along the optic axis,
and two plane reflectors forming a tube of square cross section with the axial reflectors and extending on both the object and image sides of the objective, only a segment forming one quarter of the objective being within the tube.

10. A system according to claim 9 including
such a quarter objective at each of the four edges of said tube with the optic axis coinciding respectively with the four edges.

11. A system according to claim 9 including
a rectangular matrix of juxtaposed units each of which is such a square tube with a quarter objective therein.

12. A system according to claim 10 including
a rectangular matrix of juxtaposed units each of which is such a square tube with four quarter objectives therein.

13. An optical system comprising
two bars of transparent material of rectangular cross section aligned with their respective sides coplanar,
the ends facing each other being convex segments of lenses having a common optic axis along the middle of one of the sides of the bars,
said side being totally internally reflecting to constitute a plane reflector lying on the optic axis of the lens segment.

14. An optical system including a plurality of units each according to claim 13, juxtaposed relatively horizontally with the axial reflecting surfaces relatively vertical.

15. An optical system according to claim 13 in which the outer end of each bar includes a surface substantially at 45° to the horizontal sides of the bar,
said 45° surfaces at one end of the system being coplanar and at 90° to the 45° surfaces at the other end of the system.

References Cited

UNITED STATES PATENTS

| | | | |
|---|---|---|---|
| 1,966,261 | 7/1934 | Petit et al. | 95—15 |
| 3,060,805 | 10/1962 | Brumley | 88—57 |
| 3,060,806 | 10/1962 | Lewis et al. | 88—57 |
| 3,125,013 | 3/1964 | Herrick et al. | 95—75 |
| 3,175,481 | 3/1965 | Lahr | 95—75 |
| 3,192,843 | 7/1965 | Kapany et al. | 95—73 |
| 3,194,142 | 7/1965 | Black | 95—73 |
| 3,241,438 | 3/1966 | Frank | 88—24 |
| 3,264,933 | 8/1966 | Frank | 88—24 |

FOREIGN PATENTS 1,203,115  10/1965  Germany.

NORTON ANSHER, *Primary Examiner.*

RICHARD A. WINTERCORN, *Assistant Examiner.*